United States Patent [19]

Shichijo et al.

[11] Patent Number: 4,656,528
[45] Date of Patent: Apr. 7, 1987

[54] SIGNAL RECORDING SYSTEM FOR RECORDING SIGNALS ON A ROTARY RECORDING MEDIUM

[75] Inventors: Shunichi Shichijo, Sagamihara; Tooru Yamagishi, Tokyo; Toyotaka Machida, Kashiwa, all of Japan

[73] Assignee: Victor Company of Japan, Ltd., Yokohoma, Japan

[21] Appl. No.: 725,412

[22] Filed: Apr. 22, 1985

[30] Foreign Application Priority Data

Apr. 24, 1984 [JP] Japan .................................. 59-82334

[51] Int. Cl.[4] .............................................. H04N 5/76
[52] U.S. Cl. .................................... 358/342; 358/343
[58] Field of Search ............... 358/342, 343; 360/19.1, 360/27, 32, 10.1; 369/32, 47; 364/410, 411

[56] References Cited

U.S. PATENT DOCUMENTS 4,348,699  9/1982  Tsuchiya et al. ...................... 360/32
4,361,849 11/1982  Bolger ................................. 358/342
4,476,499 10/1984  Kanamaru et al. ................... 358/342

Primary Examiner—Donald McElheny, Jr.
Attorney, Agent, or Firm—Ladas & Parry

[57] ABSTRACT

A signal recording system for recording signals on a disc comprises a circuit for generating a modulated signal by subjecting a control program to a self clock modulation based on a reference clock and then to a band limitation to an audio signal band, which control program is transmitted in terms of blocks each having a fixed length, a circuit for generating a block discrimination signal for discriminating a beginning or end of each block, which block discriminating signal has a fundamental frequency which is different from the reference clock frequency of the modulated signal and is within the audio signal band, a circuit for time-division-multiplexing the block discrimination signal to a time period in which the modulated signal is not transmitted, and a circuit for recording the time division multiplexed signal and at least the video signal on the disc. The control program comprises control commands of a disc reproducing apparatus which plays the disc having track turns recorded with the control program at least together with the video signal and input and output commands and internal processing commands of an external device which has a discriminating function and is coupled to the disc reproducing apparatus.

9 Claims, 62 Drawing Figures

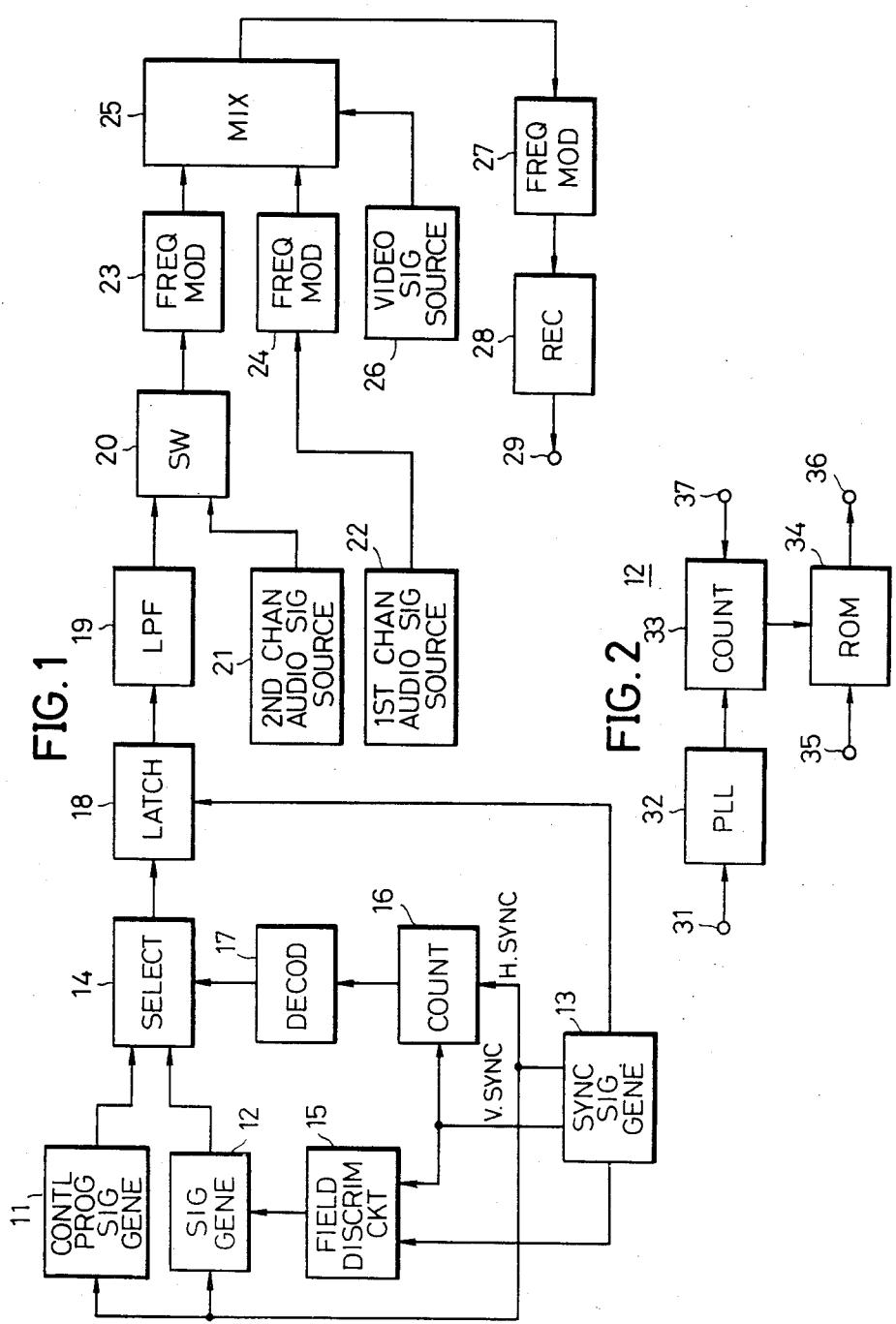

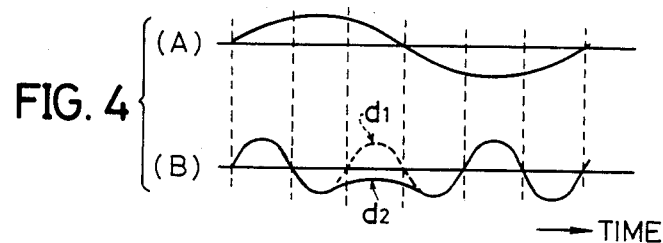
FIG. 4
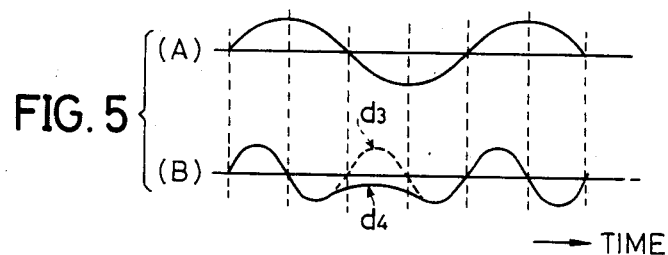
FIG. 5
FIG. 6
| HIGHER ADDRESS / LOWER ADDRESS | 0 | 1 | 2 |
|---|---|---|---|
| 0 | 0 | 1 | 1 |
| 1 | 0 | 1 | 1 |
| 2 | 0 | 0 | 0 |
| 3 | 0 | 0 | 0 |
| 4 | 1 | 0 | 0 |
| 5 | 1 | 0 | 0 |
| 6 | 1 | 1 | 1 |
| 7 | 0 | 1 | 1 |
| 8 | 0 | 1 | 1 |
| 9 | 1 | 1 | 1 |
| A | 0 | 0 | 0 |
| B | 1 | 0 | 0 |
| C | 0 | 0 | 0 |
| D | 1 | 0 | 0 |
| E | 0 | 1 | 1 |
| F | 1 | 1 | 1 |
FIG. 8
| HIGHER ADDRESS / LOWER ADDRESS | 0 | 1 | 2 |
|---|---|---|---|
| 0 | 0 | 0 | 1 |
| 1 | 0 | 1 | 1 |
| 2 | 0 | 1 | 0 |
| 3 | 0 | 0 | 0 |
| 4 | 1 | 0 | 0 |
| 5 | 1 | 0 | 0 |
| 6 | 1 | 1 | 1 |
| 7 | 0 | 1 | 1 |
| 8 | 0 | 1 | 1 |
| 9 | 1 | 1 | 1 |
| A | 0 | 0 | 0 |
| B | 1 | 0 | 0 |
| C | 0 | 0 | 0 |
| D | 1 | 0 | 0 |
| E | 0 | 1 | 1 |
| F | 1 | 1 | 1 |

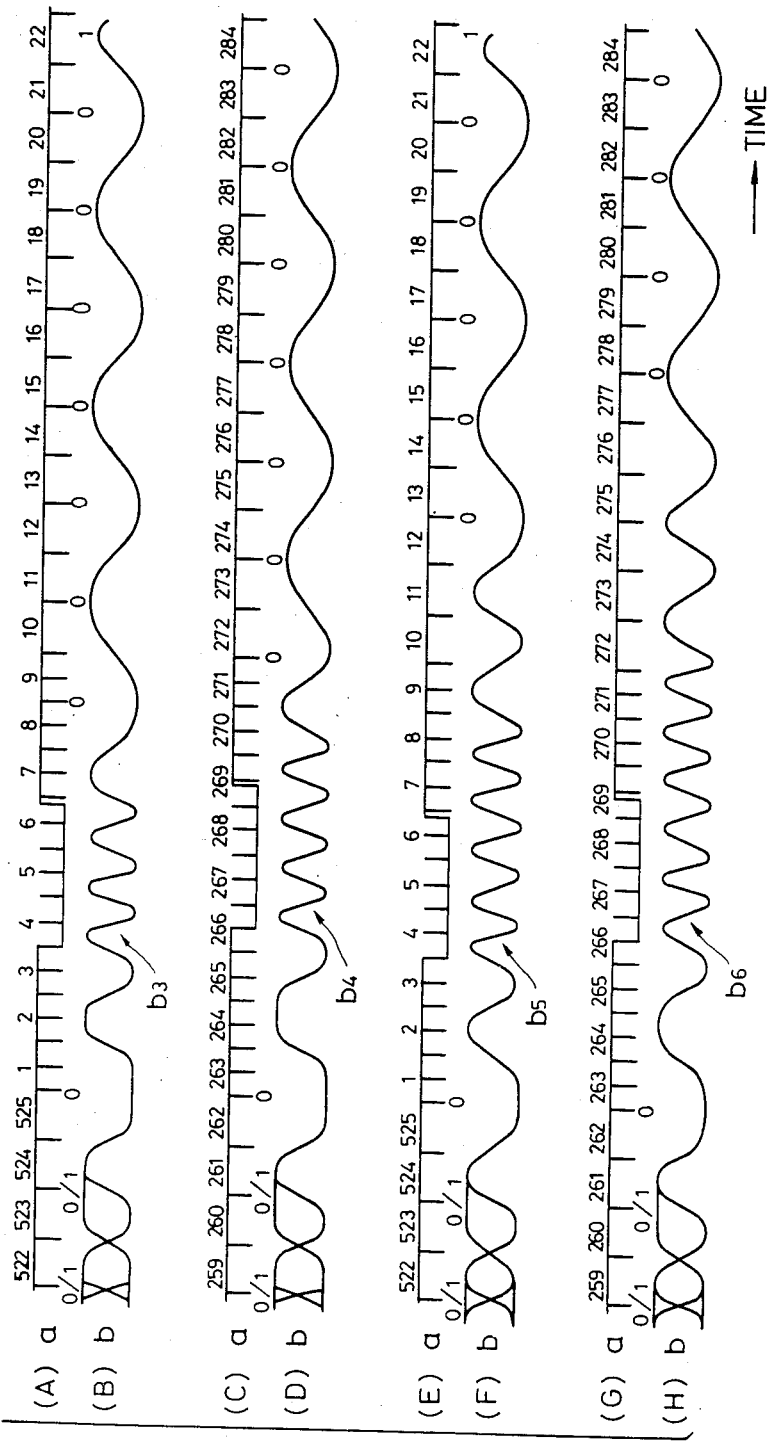

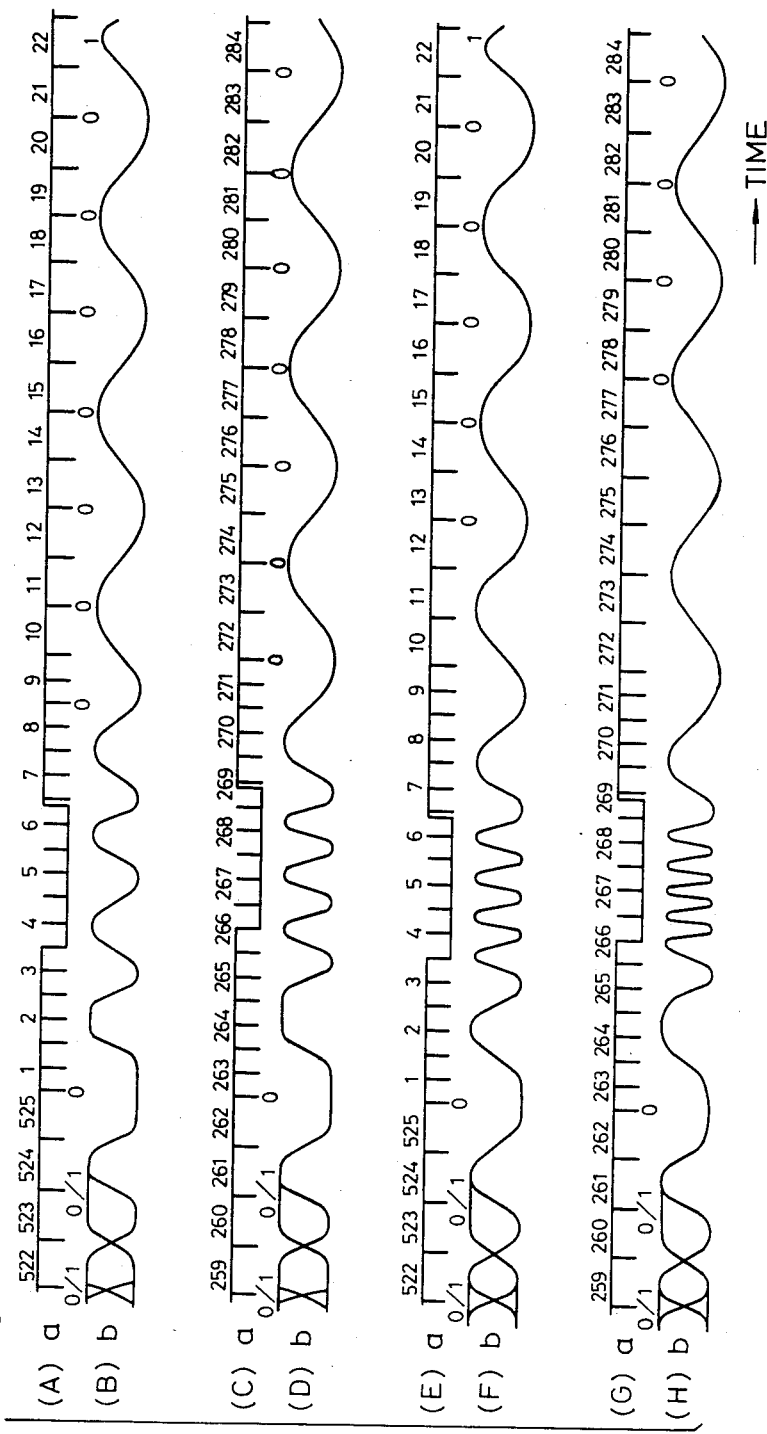

FIG.10

SIGNAL RECORDING SYSTEM FOR RECORDING SIGNALS ON A ROTARY RECORDING MEDIUM

BACKGROUND OF THE INVENTION

The present invention generally relates to signal recording systems for recording information signals and a control program signal on a rotary recording medium, and more particularly to a signal recording system which obtains a time division multiplexed signal by time-division-multiplexing to the control program signal which is transmitted in terms of blocks a block discrimination signal for discriminating the beginning or end of the block and records the time division multiplexed signal on the rotary recording medium.

Heretofore, attempts have been made to more effectively utilize information signals which are recorded on a rotary recording medium (hereinafter simply referred to as a disc). Such attempts include coupling to a disc reproducing apparatus an external device such as a microcomputer which has a discriminating function, for example, and controlling the disc reproducing apparatus by the microcomputer. The control of the disc reproducing apparatus by the external device is carried out based on control programs which are recorded on the disc together with the information signals such as video and audio signals. As a result, it is possible to play the disc on the disc reproducing apparatus in the so-called interactive mode between the external device.

A signal recording system for recording the control programs described above and a disc which is recorded with the control programs, are disclosed in a U.S. patent application Ser. No. 574,521 filed Jan. 27, 1984 in which the assignee is the same as the assignee of the present application. According to this previously proposed signal recording system, a modulated signal is obtained by modulating digital data related to the control programs according to a self clock modulation system based on a reference clock having a period which is twice the horizontal scanning period of the video signal, for example. The modulated signal is then band-limited to the audio signal band, and is recorded independently on the disc or is multiplexed in time sequence with the audio signal and recorded on the disc. The control programs are written in at least down load type statements and direct statements. In the present specification, a statement which is executed after being once loaded into the external device is referred to as a down load type statement, and a statement which is executed immediately without being loaded into the external device is referred to as a direct statement.

According to the previously proposed signal recording system described before, the following superior effects can be obtained.

(a) Because the control programs are time-sequentially recorded on the disc so as to maintain a perfect one-to-one relationship with the corresponding video and audio signals, it is unnecessary to store reproduced control programs which are written in direct statements. In addition, control programs which are written in down load type statements are loaded into the external device every time the control program is reproduced, and it is possible to perform operations such as replacement, partial deletion, and addition with respect to the already stored programs. Accordingly, the memory capacity required in the external device can be kept down to a minimum.

(b) It is possible to record the control programs in the limited audio signal band, since a modulated signal which is obtained by modulating the control programs according to a self clock modulation system such as the biphase space modulation and the biphase mark modulation is recorded on the disc as a control program signal.

(c) Because the control program signal is recorded on the same tracks on the disc as the video and audio signals, the limited recording capacity of the disc is effectively utilized compared to a case where tracks are provided exclusively for recording the control program signal. With respect to the video signal, it is possible to obtain a large recording capacity which is the same as the recording capacity obtainable in the disc which is not recorded with the control program signal.

(d) When cutting the disc, it is possible to reproduce the control program signal from a master tape or a master disc as in the case of the video and audio signals and continuously record the control program signal simultaneously as the video and audio signals.

(e) By preparing a number of interpreters which are used for interpreting the language with which the programs are recorded on the disc in accordance with the total number of kinds of languages which are anticipated on being used in various external devices, the control programs which are recorded on the same kind of disc can always be written in a predetermined kind of language. Thus, compared to the conventional case where it is essential to prepare a specific number of control programs corresponding to all kinds of external devices which are anticipated on being used, even with respect to the same kind of disc, the burden on the developer of the software is greatly reduced.

(f) Because the control programs written in the down load type statements can be recorded on the disc in a scattered manner at time positions which are unrelated to the actual time positions where the control programs are executed, it is possible to increase the freedom of the recording timing with which the audio signal is recorded in a state multiplexed in time sequence with the control program signal.

However, according to the previously proposed signal recording system, the control program signal is recorded in the transmission path of the audio signal. On the other hand, the existence of the control program signal, that is, whether the control program signal is recorded, is discriminated by use of a part of an address signal which is originally used for discriminating the number of tracks, which address signal is recorded in the transmission path of the video signal. For this reason, there is a problem in that the circuit construction of a circuit which discriminates the existence of the control program signal by use of a part of the address signal becomes complex. In addition, there is a problem in that complex programs are required to control an interface which couples the disc reproducing apparatus and the external device.

Further, the processing speed of the external device and the response speed of the disc reproducing apparatus differ depending on the contents of the control commands and the timing with which the control commands are reproduced. Accordingly, in order to carry out a control in correspondence with each field of the video signal, it is necessary to discriminate the field of the reproduced video signal in one track turn when the video signal is recorded on the disc at a rate of a plurality of fields per track turn. For example, in a case where the video signal is recorded on the disc at the rate of four fields per track turn, it is necessary to discriminate which one of the four fields the reproduced video signal is related to. It is possible to reproduce a reference signal which is recorded in a vertical blanking period part of the disc, for example, and discriminate the field of the video signal based on the reproduced reference signal. The supply of the control program signal from the disc reproducing apparatus to the interface is carried out based on the above discriminated result. Hence, according to the previously proposed signal recording system, there is a problem in that the circuit construction of a discriminating circuit for discriminating at the time of the reproduction the field to which the reproduced video signal is related, becomes complex. This is because the reference signal is not always reproduced during one revolution of the disc. For example, the reference signal is not reproduced during one revolution of the disc in a case where one track turn is not scanned in its entirety but the scan is shifted from the one track turn to another track turn.

SUMMARY OF THE INVENTION

Accordingly, it is a general object of the present invention to provide a novel and useful signal recording system for recording signals on the disc, in which the problems described heretofore are eliminated.

Another and more specific object of the present invention is to provide a signal recording system which obtains a time division multiplexed signal by time-division-multiplexing a block discrimination signal to a modulated signal which is obtained by modulating a control program signal according to a self clock modulation system, and recording the time division multiplexed signal on a disc at least together with a video signal, on the same tracks as the video signal. According to the signal recording system of the present invention, it is possible to easily discriminate the beginning or end of each block of the control signal having a fixed length, by use of the block discrimination signal which is transmitted in the same transmission path as the control program signal in a disc reproducing apparatus. In addition, because the block discrimination signal is transmitted in the same transmission path as the control program signal, a circuit within the disc reproducing apparatus for detecting the block discrimination signal has a simple circuit construction. Further, programs for controlling an interface which couples the disc reproducing apparatus and an external device are simple compared to the conventional case.

Still another object of the present invention is to provide a signal recording system which obtains the time division multiplexed signal by time-division-multiplexing to the modulated signal a block discrimination signal having a fundamental frequency which is n times or 1/n the reference clock frequency of the modulated signal, where n is an even number, and records the time division multiplexed signal on the disc at least together with the video signal, on the same tracks as the video signal. According to the signal recording system of the present invention, it is possible to positively distinguish the modulated signal (control program signal) and the block discrimination signal even when the reproduced level of the block discrimination signal greatly deviates due to dropout or the like.

A further object of the present invention is to provide a signal recording system which obtains the time division multiplexed signal by time-division-multiplexing to the modulated signal a block discrimination signal which is in phase synchronism with a vertical synchronizing signal of the video signal, and records the time division multiplexed signal on the disc at least together with the video signal, on the same tracks as the video signal. According to the signal recording system of the present invention, it is possible to obtain from the reproduced block discrimination signal the reproduced timing of the vertical synchronizing signal. Accordingly, in a case where the control program signal is recorded on the disc in terms of the vertical synchronizing signal, it is possible to obtain in the disc reproducing apparatus and the external device an information on whether the control program signal is recorded within a certain time period of one field, in phase synchronism with the vertical synchronizing signal.

Another object of the present invention is to provide a signal recording system which obtains the time division multiplexed signal by time-division-multiplexing to the modulated signal a block discrimination signal having at least one of the fundamental frequency, amplitude, and signal duration varied for each field of the information signals which are recorded on the disc at the rate of a plurality of fields per track turn, and records the time division multiplexed signal on the disc at least together with the video signal within the information signals, on the same tracks as the video signal. According to the signal recording system of the present invention, it is possible to reproduce the modulated signal (control program signal) and control the external device, in correspondence with each or specific field of the information signals. For example, in a case where a control program signal which differs for every predetermined number of fields and the block discrimination signal are recorded on the disc, it is possible to play the disc on the disc reproducing apparatus in the interactive mode between the external device, based solely on the control program signal of a specific field discriminated by the block discrimination signal.

Other objects and further features of the present invention will be apparent from the following detailed description when read in conjunction with the accompanying drawings.

BRIEF DESCRIPTION OF THE DRAWINGS

FIG. 1 is a system block diagram showing a first embodiment of the signal recording system according to the present invention;

FIG. 2 is a system block diagram showing an embodiment of a signal generating circuit within the block system shown in FIG. 1;

FIGS. 4(A) and 4(B) and FIGS. 5(A) and 5(B) show signal waveforms of a control program signal a block discrimination signal containing a defect;

FIG. 6 shows a part of data pre-stored in a read only memory shown in FIG. 2;

FIGS. 7(A) through 7(H) show signal waveforms for explaining another embodiment of the signal waveform of the time division multiplexed signal which is recorded according to the signal recording system of the present invention;

FIG. 8 shows a part of data pre-stored in the read only memory shown in FIG. 2 when obtaining the waveforms shown in FIGS. 7(A) through 7(H);

Figure 10:
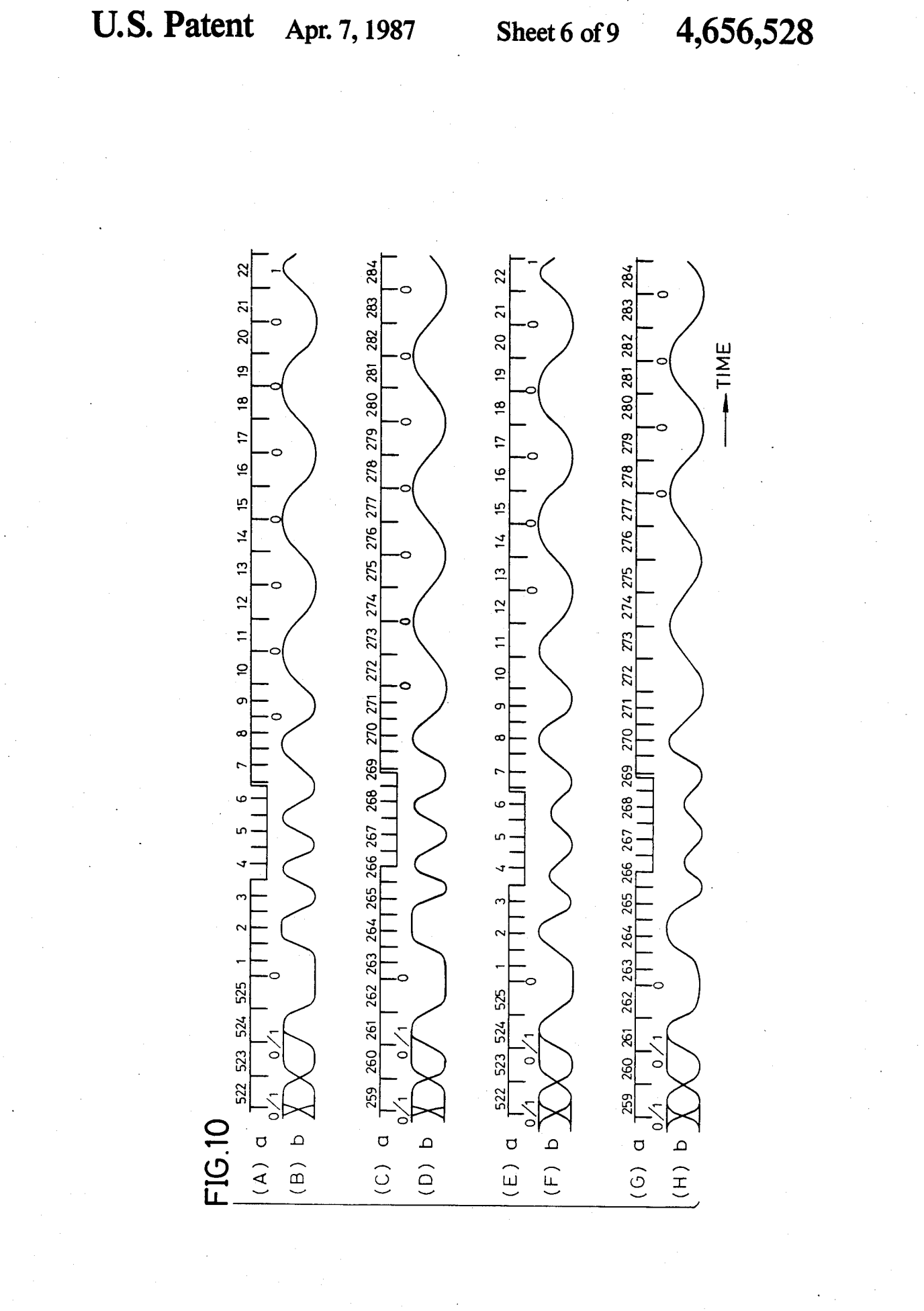

FIGS. 9(A) through 9(H) and FIGS. 10(A) through 10(H) show signal waveforms for explaining further embodiments of the signal waveform of the time division multiplexed signal which is recorded according to the signal recording system of the present invention;

DETAILED DESCRIPTION

Figure 3:
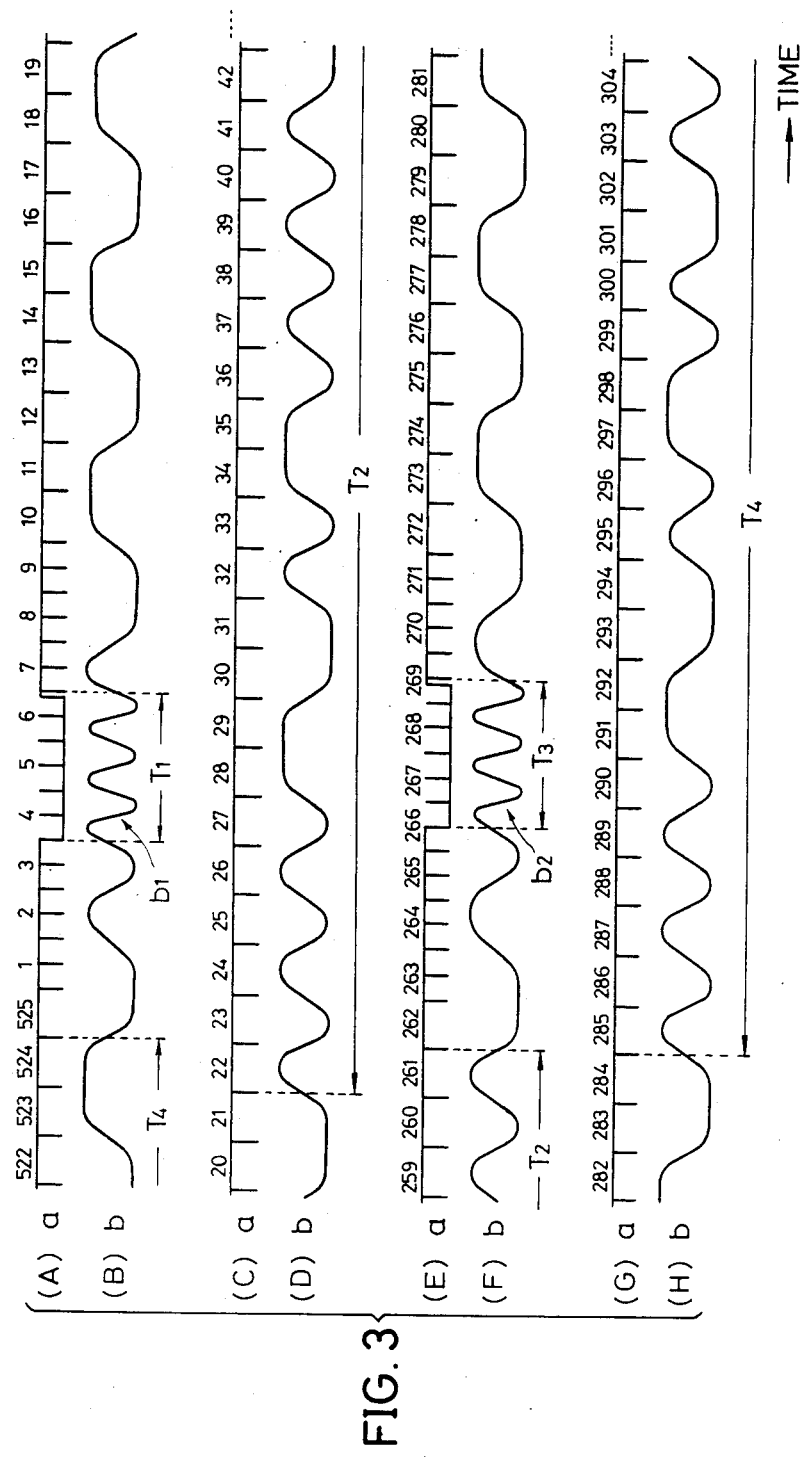
FIGS. 3(A) through 3(H) show signal waveforms for explaining an embodiment of the signal waveform of a time division multiplexed signal which is recorded according to the signal recording system of the present invention.

FIG. 1 is a system block diagram showing a first embodiment of the signal recording system according to the present invention. A horizontal synchronizing signal from a synchronizing signal generating circuit 13 is supplied to a control program signal generating circuit 11 and a signal generating circuit 12. The control program signal generating circuit 11 generates a control program signal. In the present embodiment, the control program signal generated from the control program signal generating circuit 11 is a modulated signal, such as the modulated signal obtained by the signal recording system previously proposed in the United Stated Patent Application Ser. No. 574,521 described before.

The control program is made up of input and output commands and internal processing commands of an external device such as a computer having a discriminating function, and control commands of a disc reproducing apparatus. The control program is at least written in down load type statements and direct statements. Digital data related to the control program are modulated according to a self clock modulation system such as the biphase space modulation and the biphase mark modulation based on a reference clock having a period which is a natural number multiple of the horizontal scanning period of the video signal, and then band-limited to the audio signal band so as to obtain a modulated signal. This modulated signal is the control program signal.

The control program signal is transmitted in terms of blocks each having a total of fifteen bytes. One block of the control program signal comprises fourteen bytes of program information data and one byte of framing code added in front of the program information data so as to indicate the beginning of the program information data. One bit of the control program signal is transmitted in two horizontal scanning periods (2H). In a case where the video signal to be recorded together with the control program signal is of the NTSC system, the control program signal is transmitted in a total time period of 240H from the scanning line number 22 to 261 (or from the scanning line number 285 to 524), but is not transmitted in a total time period of 22.5H. Such a measure is taken so that it is possible to positively reproduce the control program signal even at a time of a special reproduction or the like when a reproducing element of the disc reproducing apparatus is forcibly shifted from one track turn to another track turn in the vicinity of the scanning line number 11 (or 274) within the vertical blanking period, for example. The control program signal generated from the control program signal generating circuit 11 is supplied to a selector 14.

A field discriminating circuit 15 is supplied with a vertical synchronizing signal and a signal having a period of a predetermined number of fields, which signals are obtained from the synchronizing signal generating circuit 13, and produces a field discrimination signal which is obtained by discriminating the field. The signal generating circuit 12 generates a block discrimination signal based on the horizontal synchronizing signal from the synchronizing signal generating circuit 13 and the field discrimination signal from the field discriminating circuit 15, and supplies the block discrimination signal to the selector 14. The block discrimination signal is generated during a predetermined time period in which the control program signal is not generated from the control program signal generating circuit 11.

A counter 16 is reset by the vertical synchronizing signal from the synchronizing signal generating circuit 13. The counter 16 counts the horizontal synchronizing signals from the synchronizing signal generating circuit 13, and supplies a counted output signal to a decoder 17. The decoder 17 discriminates the counted output signal of the counter 16, that is, the number of horizontal synchronizing signals following the vertical synchronizing signal, and supplies a control signal to the selector 14. Accordingly, responsive to the output control signal of the decoder 17, the selector 14 is controlled to selectively pass the control program signal from the control program signal generating circuit 11 during a first time period from the scanning line number 22 to 261 and during a second time period from the scanning line number 285 to 524, and to selectively pass the block discrimination signal from the signal generating circuit 12 during other time periods. The signal which is selectively obtained from the selector 14 is supplied to a latch circuit 18 wherein the signal is latched by a signal from the synchronizing signal generating circuit 13 having a frequency which is twice the frequency of the horizontal synchronizing signal.

An output signal of the latch circuit 18 is supplied to a lowpass filter 19 and is band-limited to the audio signal band. An output signal of the lowpass filter 19 is supplied to a switching circuit 20. The switching circuit 20 is also supplied with a second channel audio signal from a second channel audio signal source 21. The output signal of the lowpass filter 19 may be recorded in place of the second channel audio signal, or may be recorded in a state multiplexed in time sequence with the second channel audio signal. In the former case, the switching circuit 20 is designed to constantly pass and supply the output signal of the lowpass filter 19 to a frequency modulator 23. On the other hand, in the latter case, the switching circuit 20 is designed to normally pass the output signal of the lowpass filter 19 and to pass the second channel audio signal only during a time period in which the control program signal does not exist and no output signal is obtained from the lowpass filter 19. A first frequency modulated signal from the frequency modulator 23 is supplied to a mixing circuit 25.

A first channel audio signal from a first channel audio signal source 22 is supplied to a frequency modulator 24, and a second frequency modulated signal from the frequency modulator 24 is supplied to the mixing circuit 25. The mixing circuit 25 is also supplied with a video signal from a video signal source 26. For example, the video signal from the video signal source 26 is a color video signal in which a luminance signal which is band-limited and a carrier chrominance signal which is frequency-converted into a low frequency range are band-share-multiplexed. The mixing circuit 25 frequency-division-multiplexes the first and second frequency modulated signals and the video signal, and supplies a frequency division multiplexed signal to a frequency modulator 27. The frequency division multiplexed signal which is frequency-modulated in the frequency modulator 27 is passed through a recording circuit 28 and an output terminal 29, and is recorded on a spiral track or concentric tracks on a disc (not shown) by a known cutting apparatus (not shown) which uses a laser beam. Accordingly, the control program signal is recorded on the disc together with the block discrimination signal, on the same tracks as the video and audio signals. The frequency division multiplexed signal which is frequency modulated, is recorded on the disc at a rate of four fields per track turn, for example.

Next, description will be given with respect to an embodiment of the signal generating circuit 12 shown in FIG. 1 and embodiments of the waveform of the block discrimination signal. An embodiment of the signal generating circuit 12 is shown in FIG. 2. In FIG. 2, the horizontal synchronizing signal from the synchronizing signal generating circuit 13 shown in FIG. 1 is applied to an input terminal 31. The horizontal synchronizing signal is supplied to a phase locked loop (PLL) circuit 32 wherein the horizontal synchronizing signal is converted into a signal having a period which is ½ the horizontal scanning period, for example. The output signal of the PLL circuit 32 is supplied to a counter 33, and a counted output signal of the counter 33 is supplied to a read only memory (ROM) 34. The ROM 34 pre-stores data related to the waveform of the block discrimination signal. The data which are related to the waveform of the block discrimination signal and are pre-stored in the ROM 34, are read out from the ROM 34 based on the counted output signal of the counter 33 and the field discrimination signal which is received through an input terminal 35 from the field discriminating circuit 15 shown in FIG. 1. The data read out from the ROM 34 are successively supplied to the selector 14 shown in FIG. 1, through an output terminal 36. The counter 33 is reset by a reset signal applied to an input terminal 37. For example, the reset signal applied to the input terminal 37 may be obtained by the decoder 17 shown in FIG. 1.

Next, description will be given with respect to each embodiment of the waveform of the block discrimination signal. A first embodiment of the waveform of the block discrimination signal will now be described by referring to FIGS. 3(A) through 3(H). In FIGS. 3(A) through 3(H), the waveform of a composite synchronizing signal which is to be recorded is represented by a, and numbers appearing above the waveform indicate the scanning line number in the NTSC system color television signal. The waveform of the block discrimination signal which is obtained from the lowpass filter 19 shown in FIG. 1 is represented by b. In FIGS. 3(A) through 3(H), a time period T1 represents a time period in which the vertical synchronizing signal is transmitted. This time period T1 lasts for a time period of 3H, from the scanning line number 4 to 6. A block discrimination signal b1 having a fundamental frequency which is equal to the horizontal scanning frequency $f_H$, is transmitted during the time period T1. The control program signal part is transmitted during a time period T2 which lasts for a time period of 240H, from the scanning line number 22 to 261, and during a time period T4 which lasts for 240H, from the scanning line number 285 to 524. The frequency of the control program signal part is equal to $f_H/4$ when the reference clock frequency is equal to $f_H/2$ and the value of one bit of the control program signal is equal to "0", and is equal to $f_H/2$ when the value of one bit of the control program signal is equal to "1". Further, the vertical synchronizing signal is transmitted during a time period T3 which lasts for a time period of 3H, from the latter half of the scanning line number 266 to the first half of the scanning line number 269. A block discrimination signal b2 having a fundamental frequency $f_H$ is transmitted during this time period T3.

During time periods other than the time periods T1 through T4 described above, a signal having a fundamental frequency $f_H/4$ (that is, a signal containing a data "0") is transmitted during a time period of 2H from the scanning line number 525 to 1, a time period of 14H from the scanning line number 8 to 21, a time period of 2H from the scanning line number 262 to 263, and a time period of 14H from the scanning line number 271 to 284. On the other hand, a signal having a fundamental frequency $f_H/2$ (that is, a signal containing a data "1") is transmitted during a time period of 2H from the scanning line number 2 to 3, a time period of 1H at the scanning line number 7, and a time period of 1H from the latter half of the scanning line number 265 to the first half of the scanning line number 266. Further, a signal having a fundamental frequency $f_H/3$ is transmitted during a time period of 1.5H from the scanning line number 264 to the first half of the scanning line number 265, and a time period of 1.5H from the latter half of the scanning line number 269 to the end of the scanning line number 270. The various signals transmitted during the time periods other than the time periods T1 through T4, have frequencies thereof selected so as to enable self clock even during a time period in which the block discrimination signals b1 and b2 and the control program signal are not transmitted, and to smoothly connect the waveform.

In the present embodiment, the fundamental frequency of the block discrimination signal is selected to a frequency which is equal to the horizontal scanning frequency $f_H$, for convenience's sake. Further, the block discrimination signal is transmitted in phase synchronism with the vertical synchronizing signal. However, the present invention is characterized by the recording of a time division multiplexed signal in which the block discrimination signal is time-division-multiplexed with the control program signal. Accordingly, the fundamental frequency of the block discrimination signal simply needs to have a fundamental frequency which is different from the frequency of the control program signal so that the block discrimination signal and the control program signal can be distinguished from each other, and is within the audio signal band so that the block discrimination signal can be transmitted in the transmission path of the audio signal. Therefore, it is not essential for the block discrimination signal to be in phase synchronism with the vertical synchronizing signal.

The block discrimination signal simply needs to satisfy the conditions described above, but it is desirable to set the fundamental frequency of the block discrimination signal equal to n times or 1/n the reference clock frequency of the control program signal, where n is an even number, for the reasons which will be described hereinafter.

For example, it will be assumed that the fundamental frequency of the block discrimination signal is selected to a frequency which is three times the reference clock frequency of the control program signal shown in FIG. 4(A). In this case, when a signal part of the block discrimination signal which should appear as indicated by a phantom line d1 in FIG. 4(B) becomes as indicated by a solid line d2 due to some cause, an interval between two zero crossings becomes equal to three times the original interval between the two zero crossings. For this reason, due to this single defect in the waveform of the block discrimination signal, it becomes impossible to distinguish the control program signal and the block discrimination signal containing this defect.

On the other hand, in a case where the fundamental frequency of the block discrimination signal is selected to a frequency which is twice the reference clock frequency of the control program signal shown in FIG. 5(A), the block discrimination signal becomes as shown in FIG. 5(B). In this case, when a signal part of the block discrimination signal which should appear as indicated by a phantom line d3 in FIG. 5(B) becomes as indicated by a solid line D4 due to some cause, an interval between the two zero crossings becomes equal to three times the original interval between the two zero crossings. However, in this case, the fundamental frequency of the block discrimination signal does not become equal to the reference clock frequency of the control program signal, and it is possible to positively distinguish the control program signal and the block discrimination signal. This effect of positively distinguishing the control program signal and the block discrimination signal is obtainable not only in the case where the fundamental frequency of the block discrimination signal is selected equal to twice the reference clock frequency of the control program signal, but is also obtainable when the fundamental frequency of the block discrimination signal is selected to n times or 1/n the reference clock frequency of the control program signal, where n is an even number.

Next, a description will be given with respect to the operation of the signal generating circuit 12 shown in FIG. 2 for a case where the time division multiplexed signal shown in FIGS. 3(B), 3(D), 3(F), and 3(H) is to be obtained. In this case, data related to the scanning line numbers 262 to 284 in FIGS. 3(A) through 3(H) are pre-stored in the ROM 34 in binary numbers at addresses shown in FIG. 6, for example. In FIG. 6, data encircled by a thick solid line correspond to the data within the time period T3. It is known beforehand from the number of zeros in the data whether the signal waveform terminates in a rising state or a falling state when the signal waveform starts from a rising state (or falling state). That is, when the number of zeros in the data is an even number, the signal waveform which starts from the rising state terminates in the rising state. On the other hand, when the number of zeros in the data is an odd number, a signal waveform which starts from the rising state terminates in the falling state. Accordingly, it is possible to pre-store in the ROM 34 such data that the waveforms of the control program signal part and the signal obtained from the signal generating circuit 12 connect smoothly.

Because the counter 33 successively counts the output signal of the PLL circuit 32 and supplies the counted output signal to the ROM 34, the data shown in FIG. 6 are successively read out from addresses in the ROM 34 corresponding to the counted values obtained from the counter 33. In this case, the counter 33 is reset immediately after the scanning line number 524 and immediately after the scanning line number 261. Although the illustration thereof are omitted in FIG. 6, data related to the scanning line numbers 525 to 21 are similarly pre-stored in the ROM 34.

In the present embodiment, the block discrimination signals b1 and b2 shown in FIGS. 3(B) and 3(F) are recorded in the same time periods as the vertical synchronizing signal. For this reason, the block discrimination signal reproduced from the disc may also be used as the vertical synchronizing signal in the disc reproducing apparatus and the external device.

Next, description will be given with respect to another embodiment of the waveform of the block discrimination signal, by referring to FIGS. 7(A) through 7(H). In FIGS. 7(A) through 7(H), and FIGS. 9(A) through 9(H), FIGS. 10(A) through 10(H), and FIGS. 14(A) through 14(P) which will be described later on in the specification, the waveform of the composite synchronizing signal which is to be recorded is represented by a, the numbers indicated above the waveform of the composite synchronizing signal a indicate the scanning line numbers of the NTSC system color television signal, and the waveform of the time division multiplexed signal obtained from the lowpass filter 19 is represented by b, as in the case of FIGS. 3(A) through 3(H) described before. In the present embodiment, it will be assumed that the video signal is recorded on the disc at a rate of four fields per track turn. Further, it will be assumed that block discrimination signals b3, b4, b5, and b6 having the same fundamental frequency but having mutually different signal durations, are recorded in phase synchronism with the vertical synchronizing signal which is recorded at four positions in one track turn of the disc.

As shown in FIG. 7(B), the block discrimination signal b3 is recorded in correspondence with the recording time period of the first vertical synchronizing signal with a signal duration of 3H (that is, in the same transmission time period as the vertical synchronizing signal). The block discrimination signal b4 is recorded in correspondence with the next recording time period of the second vertical synchronizing signal with a signal duration of 4H, as shown in FIG. 7(D). The block discrimination signal b5 is recorded in correspondence with the next recording time period of the third vertical synchronizing signal with a signal duration of 5H as shown in FIG. 7(F), and the block discrimination signal b6 is recorded in correspondence with the next recording time period of the fourth vertical synchronizing signal with a signal duration of 6H as shown in FIG. 7(H). The above recording operation is thereafter repeated with a period of four fields.

According to the present embodiment, the field discriminating circuit 15 shown in FIG. 1 is supplied with a signal having a period of four fields and the vertical synchronizing signal, which signals are obtained from the synchronizing signal generating circuit 13. The signal duration of the block discrimination signal which has the fundamental frequency $f_H$ and is obtained from the signal generating circuit 12, is changed in the sequence 3H→4H→5H→6H→3H→ . . . in phase synchronism with the vertical synchronizing signal. In the present embodiment, the data related to the scanning line numbers 262 to 284 in FIGS. 7(A) through 7(H) are pre-stored in the ROM 34 shown in FIG. 2 in binary numbers at addresses shown in FIG. 8, for example. The fundamental frequency of the block discrimination signal b4 shown in FIG. 7(D) is the same as the fundamental frequency of the block discrimination signal b2 shown in FIG. 3(F), but the signal duration of the block discrimination signal b4 is equal to 4H while the signal duration of the block discrimination signal b2 is equal to 3H. Accordingly, the data encircled by a thick solid line in FIG. 8 are different from the corresponding data shown in FIG. 6. Hence, by appropriately selecting the data which are pre-stored in the ROM 34, it is possible to obtain from the signal generating circuit 12 shown in FIG. 2 a block discrimination signal having a different signal duration, a different fundamental frequency, and a different amplitude.

FIGS. 9(A) through 9(H) show a case where the fundamental frequency of the block discrimination signal is varied with a period of four fields, and FIGS. 10(A) through 10(H) show a case where the amplitude of the block discrimination signal is varied with a period of four fields. Since the operation of the circuits shown in FIGS. 1 and 2 are essentially the same as in the case described before, description on the operation of the circuits for these cases will be omitted.

It will be apparent to those skilled in the art that it is possible to vary two or more out of the fundamental frequency, signal duration, and amplitude of the block discrimination signal, instead of varying only one of the fundamental frequency, signal duration, and amplitude.

Figure 11:
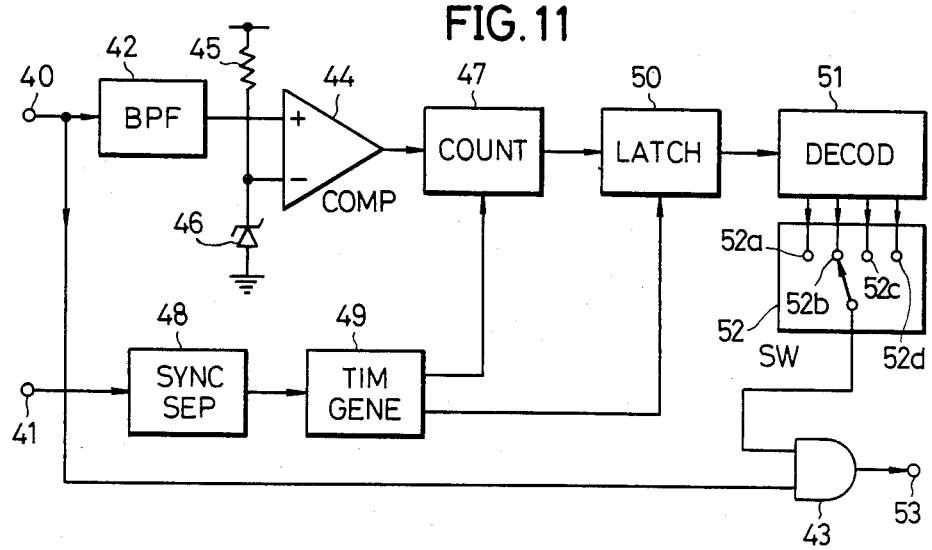
FIG. 11 is a system circuit diagram showing an example of an essential part of a disc reproducing apparatus for playing a disc which is recorded according to the signal recording system of the present invention.

Next, a description will be given with respect to a reproducing system for reproducing the block discrimination signal in the disc reproducing apparatus which is designed to play the disc which is recorded according to the signal recording system of the present invention. FIG. 11 shows an example of a reproducing system for reproducing the block discrimination signal in the disc reproducing apparatus. In FIG. 11, among signals reproduced from the disc, a reproduced time division multiplexed signal in which the block discrimination signal is time-division-multiplexed with the control program signal, is obtained from a part of a reproducing circuit (not shown) for reproducing the second channel audio signal and is applied to an input terminal 40. On the other hand, among the signals reproduced from the disc, a reproduced composite video signal is passed through a known signal processing circuit (not shown) and is applied to an input terminal 41. The reproduced time division multiplexed signal is supplied to a bandpass filter 42, and only the block discrimination signals shown in FIGS. 7(B), 7(D), 7(F), and 7(H) having the fundamental frequency $f_H$, for example, are frequency-selected. The reproduced time division multiplexed signal is also supplied to one input terminal of a 2-input AND circuit 43. A reproduced block discrimination signal obtained from the bandpass filter 42 is supplied to a non-inverting input terminal of a comparator 44 and is subjected to a level comparison with a predetermined reference voltage which is obtained by a resistor 45 and Zener diode 46. Thus, a positive polarity pulse is obtained from the comparator 44 and is supplied to a counter 47 every time a positive half cycle of the reproduced block discrimination signal is supplied to the comparator 44.

The reproduced composite video signal from the input terminal 41 is supplied to a synchronizing signal separating circuit 48 wherein only a reproduced composite synchronizing signal is separated and is supplied to a timing generator 49. The timing generator 49 generates a first pulse with a timing immediately before the incoming reproduced block discrimination signal (that is, at the scanning line numbers 1 and 263, for example) based on the reproduced composite synchronizing signal, and clears the counter 47 with this first pulse. In addition, the timing generator 49 generates a second pulse with a timing within the vertical blanking period after the vertical synchronizing signal (that is, at the scanning line numbers 275 and 13, for example), and supplies this second pulse to a latch circuit 50 as a latch pulse. As a result, the counter 47 counts the number of peaks of the reproduced block discrimination signal for every field, and the counted value in the counter 47 is latched by the latch circuit 50. An output signal of the latch circuit 50 is supplied to a decoder 51.

In a case where the block discrimination signals shown in FIGS. 7(B), 7(D), 7(F), and 7(H) are to be reproduced, the decoder 51 applies a high-level signal to a terminal 52a of a switch 52 for a time period of one field when the counted value in the counter 47 is equal to "3". Similarly, the decoder 51 applies a high-level signal for a time period of one field to a terminal 52b when the counted value in the counter 47 is equal to "4", to a terminal 52c when the counted value is equal to "5", and to a terminal 52d when the counted value is equal to "6". Depending on a selection made by an operator, the switch 52 selectively supplies to the other input terminal of the AND circuit 43 the signal applied to one of the terminals 52a through 52d. Hence, the AND circuit 43 produces the reproduced control program signal only during a desired field, and the reproduced control program signal from the AND circuit 43 is obtained through an output terminal 53. The reproducing system shown in FIG. 11 may be used for a case where it is desirable to reproduce only a specific program when playing a disc which is recorded with four kinds of programs in four mutually adjacent track turns, for example.

The present invention is not limited to the embodiments described heretofore, and the control program signal may be obtained according to a narrow band transmission system. The narrow band transmission system comprises a memory which pre-stores digital data obtained by sampling and quantizing a signal which is to be transmitted, memory control means for controlling read-out addresses of the memory depending on the value of an input digital signal and for reading out the digital data from the memory depending on the value of the input digital signal, a digital-to-analog (D/A) converter for obtaining a staircase signal by subjecting the output digital data of the memory to a digital-to-analog conversion, and a filter circuit for eliminating an unwanted frequency component from the output staircase signal of the D/A converter and for transmitting the filtered signal through a transmission path.

Figure 12:
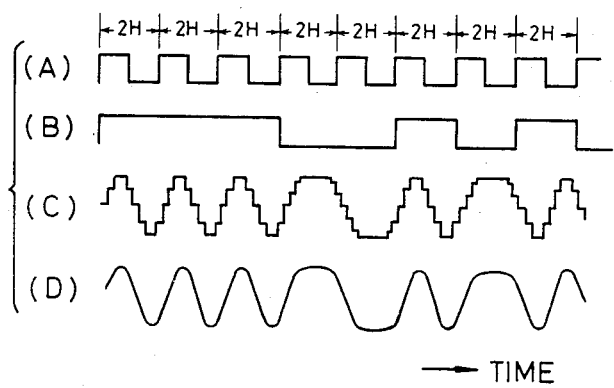
FIGS. 12(A) through 12(D) show signal waveforms for explaining the operation in a case where the control program signal is to be obtained according to a narrow band transmission system.

The data of a control program, that is, a non return to zero (NRZ) signal, is shown in FIG. 12(B). When obtaining the control program signal according to the narrow band transmission system, the digital data is obtained by subjecting the NRZ signal shown in FIG. 12(B) to a biphase mark modulation based on a reference clock shown in FIG. 12(A), for example, and the digital data obtained is supplied to the memory. The digital data to be transmitted is pre-stored in the memory, and the read-out addresses of the memory are controlled depending on the value of the input digital data supplied to the memory so as to read out predetermined data from the memory. The data read out from the memory is converted into the staircase signal shown in FIG. 12(C) by the D/A converter. The unwanted high-frequency component outside the audio signal band is eliminated from the staircase signal in the filter circuit (lowpass filter), and the signal shown in FIG. 12(D) is obtained from the filter circuit. The signal shown in FIG. 12(D) has a waveform which closely resembles the waveform of the modulated signal which is obtained when the NRZ signal shown in FIG. 12(B) is subjected to the biphase mark modulation based on the reference clock shown in FIG. 12(A). Further, the waveform of the signal shown in FIG. 12(D) is closer to a square wave than the control program signal (modulated signal) used in the embodiments described before. For this reason, the control program signal obtained according to the narrow band transmission system is less affected by noise and jitter compared to the control program signal used in the embodiments described before.

Figure 13:
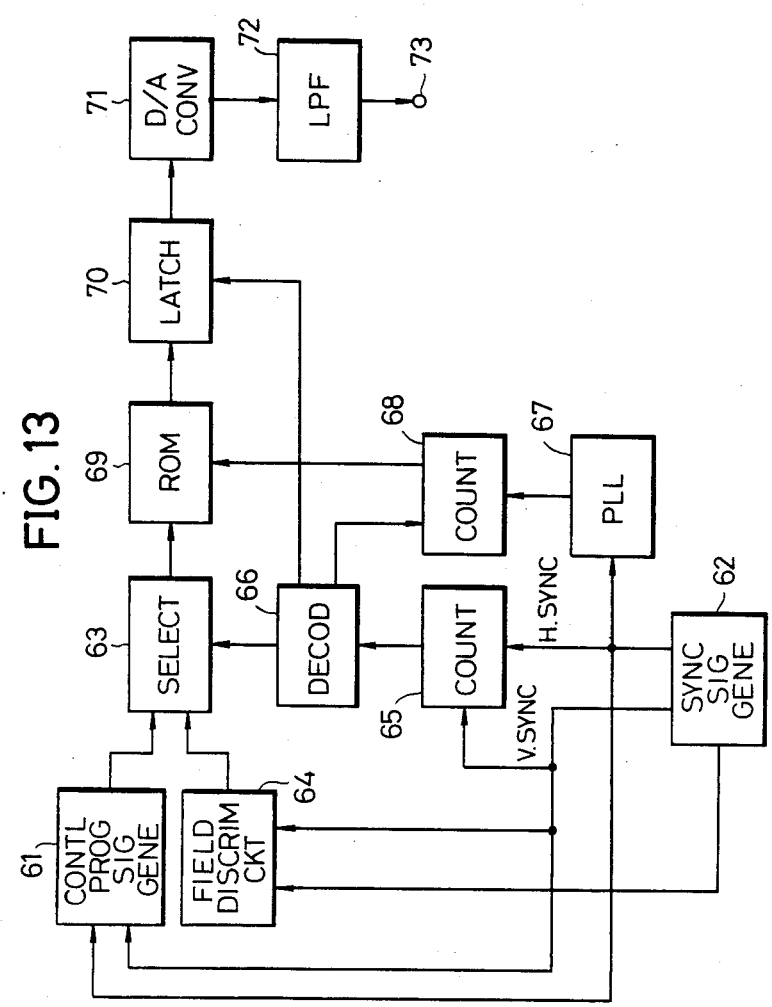
FIG. 13 is a system block diagram showing an essential part of a second embodiment of the signal recording system according to the present invention.
Figure 14:
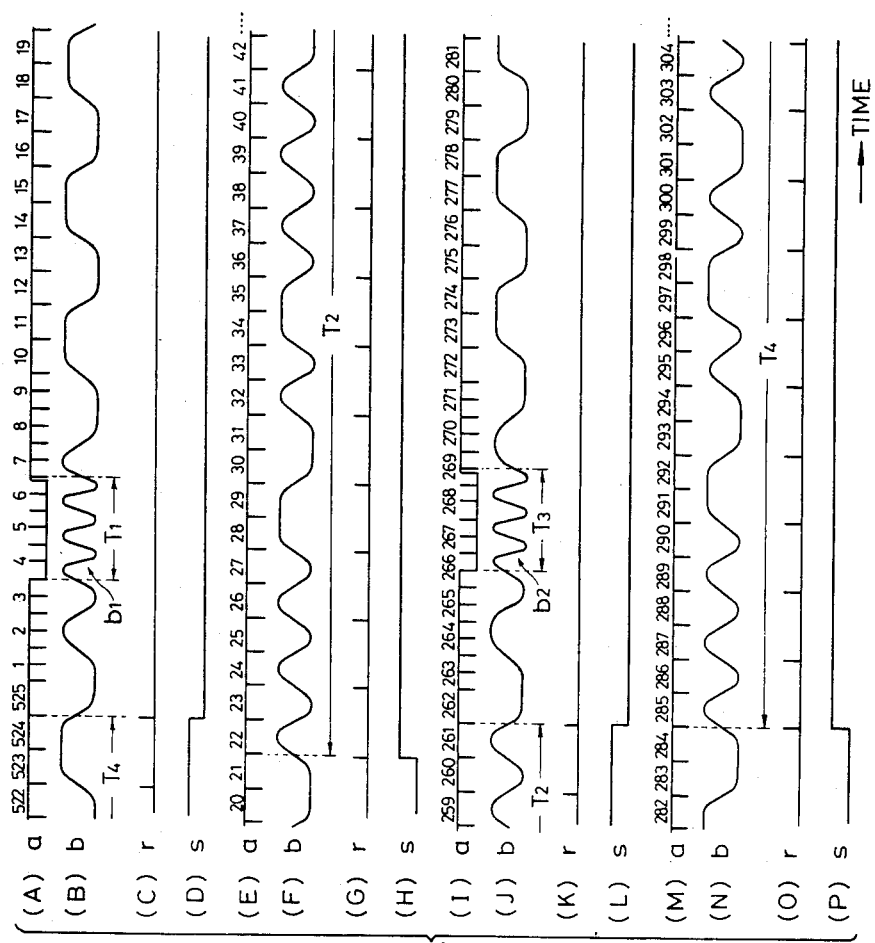
FIGS. 14(A) through 14(P) show signal waveforms for explaining the operation of the block system shown in FIG. 13.

Next, a description will be given with respect to a second embodiment of the signal recording system according to the present invention. FIG. 13 shows an essential part of the present embodiment. The narrow band transmission system described before is employed in the present embodiment.

In FIG. 13, a control program signal generating circuit 61 is supplied with horizontal and vertical synchronizing signals from a synchronizing signal generating circuit 62. The control program signal generating circuit 61 generates a program control signal (modulated signal) which is obtained by subjecting a digital data (NRZ signal) related to the control program to a self clock modulation such as the biphase mark modulation based on the reference clock shown in FIG. 12(A), for example. The program control signal from the program control signal generating circuit 61 is supplied to a selector 63. A field discriminating circuit 64 supplies to the selector 63 a field discrimination signal which is in accordance with the output signals of the synchronizing signal generating circuit 62. A counter 65 counts the horizontal synchronizing signal from the synchronizing signal generating circuit 62 and supplies a counted output signal to a decoder 66. The counter 65 is reset by the vertical synchronizing signal from the synchronizing signal generating circuit 62. The decoder 66 generates pulse signals having various timings based on the output signal of the counter 65.

A PLL circuit 67 is supplied with the horizontal synchronizing signal from the synchronizing signal generating circuit 62 and converts the horizontal synchronizing signal into a signal having a period which is 1/10 the horizontal scanning period, for example. The output signal of the PLL circuit 67 is counted in a counter 68, and a counted output signal of the counter 68 is supplied to a ROM 69. The counter 68 is reset by a reset signal from the decoder 66.

A first data group obtained by sampling and quantizing data related to the control program which is to be transmitted, is pre-stored in the ROM 69. In a case where a signal having the waveform shown in FIGS. 14(B), 14(F), 14(J), and 14(N) (essentially the same as the signal shown in FIGS. 3(B), 3(D), 3(F), and 3(H) is to be obtained through an output terminal 73, the first data group comprises digital data corresponding to the scanning line numbers 22 to 261 and the scanning line numbers 285 to 524 of the NTSC system color video signal shown in FIGS. 14(A), 14(E), 14(I) and 14(M). On the other hand, a second data group comprising digital data corresponding to the scanning line numbers 262 to 284 and the scanning line numbers 525 to 21, is also pre-stored in the ROM 69, in a manner similar to the case described before in conjunction with FIG. 6.

The decoder 66 supplies to the selector 63 a waveform select signal shown in FIGS. 14(D), 14(H), 14(L), and 14(P). Hence, the selector 63 is controlled to selectively pass and supply the output signal of the control program signal generating circuit 61 to the ROM 69 during a high-level period of the waveform select signal, and to selectively pass and supply the output signal of the field discriminating circuit to the ROM 69 during a low-level period of the waveform select signal. On the other hand, the counter 68 is reset by a reset signal shown in FIGS. 14(C), 14(G), 14(K), and 14(O) obtained from the decoder 66. Accordingly, based on the value of the data supplied from the selector 63 to the ROM 69 and the counted output signal of the counter 68, the pre-stored data are successively read out from the ROM 69 and are supplied to a latch circuit 70. The latch circuit 70 latches the data read out from the ROM 69 responsive to a latch pulse from the decoder 66, and supplies the latched data to a digital-to-analog (D/A) converter 71. An output signal of the D/A converter 71 is passed through a lowpass filter 72 and the output terminal 73, and is supplied to the switching circuit 20 shown in FIG. 1.

In the present embodiment, it is also possible to freely change the signal duration, the fundamental frequency, and the amplitude of the block discrimination signal by appropriately changing a part of or the entire second data group pre-stored in the ROM 69, without making modifications in the circuit construction of the circuit shown in FIG. 13.

The embodiments described heretofore are described for the case where the video signal is the NTSC system color video signal. However, the video signal is of course not limited to the NTSC system color video signal.

Further, the present invention is not limited to these embodiments, but various variations and modifications may be made without departing from the scope of the present invention.

What is claimed is:

1. A signal recording system for recording signals on a rotary recording medium, said signal recording system comprising:
control program signal generating means for generating a modulated signal by subjecting a control program to a self clock modulation based on a reference clock having a period which is a natural number multiple of one horizontal scanning frequency of a video signal and then to a band limitation to an audio signal band, said control program being transmitted in terms of blocks each having a fixed length approximately equal to a time period of one field of the video signal, said control program comprising control commands of a reproducing apparatus which plays a rotary recording medium having track turns recorded with said control program at least together with the video signal and input and output commands and internal processing commands of an external device which has a discriminating function and is coupled to the reproducing apparatus, said commands of said control program being written at least in down load type statements and direct statements;

block discrimination signal generating means for generating a block discrimination signal for discriminating a beginning or end of each block having the fixed length, said block discriminating signal having a fundamental frequency which is different from the reference clock frequency of said modulated signal and is within the audio signal band;

time division multiplexing means for time-division-multiplexing said block discrimination signal to a time period in which said modulated signal is not transmitted so as to obtain a time division multiplexed signal; and recording means for recording said time division multiplexed signal and at least the video signal on the rotary recording medium in phase synchronism with a horizontal synchronizing signal of the video signal.

2. A signal recording system as claimed in claim 1 in which said block discrimination signal generating means generates a block discrimination signal having a fundamental frequency which is n times or 1/n the reference clock frequency of said modulated signal, where n is an even number.

3. A signal recording system as claimed in claim 1 in which said block discrimination signal generting means generates a block discrimination signal which is in phase synchronism with a vertical synchronizing signal of the video signal.

4. A signal recording system as claimed in claim 1 in which said recording means records the video signal on the rotary recording medium at a rate of a plurality of fields per track turn, and said block discrimination signal generating means generates a block discrimination signal having at least one of the fundamental frequency, amplitude, and signal duration varied for each field so as to discriminate one or a plurality of specific fields among the plurality of fields in each track turn.

5. A signal recording system as claimed in claim 1 in which said recording means records on the rotary recording medium a signal in which a second channel audio signal is multiplexed in time sequence with said time division multiplexed signal together with the video signal.

6. A signal recording system as claimed in claim 1 in which said recording means records on the rotary recording medium said time division multiplexed signal in place of a second channel audio signal together with the video signal.

7. A signal recording system as claimed in claim 1 in which said block discrimination signal generating means comprises memory means for pre-storing waveform data related to a signal waveform which is to be transmitted in the time period in which said modulated signal is not transmitted.

8. A signal recording system as claimed in claim 7 in which said memory means additionally pre-stores program data obtained by sampling and quantizing data related to the control program which is to be transmitted, and said time division multiplexing means obtains said time division multiplexed signal by reading out from said memory means said program data during a time period in which said modulated signal is transmitted and reading out from said memory means said waveform data during the time period in which said modulated signal is not transmitted.

9. A signal recording system as claimed in claim 1 in which said recording means comprises first frequency modulating means for obtaining first and second frequency modulated signals by frequency-modulating each of said time division multiplexed signal and a first channel audio signal, frequency division multiplexing means for frequency-division-multiplexing said video signal and said first and second frequency modulated signal so as to obtain a frequency division multiplexed signal, and second frequency modulating means for frequency-modulating said frequency division multiplexed signal so as to obtain a signal to be recorded on the rotary recording medium.

* * * * *